United States Patent
Hawk (10) Patent No.: US 7,611,659 B2
(45) Date of Patent: Nov. 3, 2009

(54) METHOD AND APPARATUS FOR MAKING A PLASTIC CONTAINER HAVING AN ORIENTED FINISH PORTION

(75) Inventor: Wesley Spencer Hawk, York, PA (US)

(73) Assignee: Graham Packaging Company, L.P., York, PA (US)

( * ) Notice: Subject to any disclaimer, the term of this patent is extended or adjusted under 35 U.S.C. 154(b) by 598 days.

(21) Appl. No.: 11/416,174

(22) Filed: May 3, 2006

(65) Prior Publication Data

US 2007/0257403 A1   Nov. 8, 2007

(51) Int. Cl.
  *B29C 49/06* (2006.01)
  *B29C 49/36* (2006.01)
  *B29C 31/08* (2006.01)

(52) U.S. Cl. .................. 264/538; 425/533; 425/534; 425/540

(58) Field of Classification Search ............ 425/533, 425/534, 540; 264/538
  See application file for complete search history.

(56) References Cited

U.S. PATENT DOCUMENTS

| | | | |
|---|---|---|---|
| 3,276,356 A * | 10/1966 | Usko et al. .................. 101/40 |
| 3,576,247 A | 4/1971 | Caulford et al. |
| 3,599,280 A * | 8/1971 | Rosenkranz et al. ............ 425/3 |
| 3,994,655 A * | 11/1976 | Edwards et al. ............. 425/526 |
| 4,212,841 A | 7/1980 | Michel |
| 4,295,811 A | 10/1981 | Sauer |
| 4,309,380 A | 1/1982 | Sauer |
| 4,310,282 A * | 1/1982 | Spurr et al. .................. 425/533 |
| 4,592,720 A * | 6/1986 | Dugan et al. ................ 425/526 |
| 4,604,044 A * | 8/1986 | Hafele ........................ 425/525 |
| 4,664,248 A | 5/1987 | Goodman et al. |
| 4,723,906 A | 2/1988 | Gibbemeyer |
| 4,767,311 A | 8/1988 | Gibbemeyer |
| 4,784,253 A | 11/1988 | Gibbemeyer |
| 4,795,023 A | 1/1989 | Gibbemeyer |
| 4,801,001 A | 1/1989 | Gibbemeyer |
| 4,818,212 A | 4/1989 | Gibbemeyer |
| 5,035,603 A * | 7/1991 | Unterlander et al. ......... 425/522 |
| 5,282,526 A * | 2/1994 | Gibbemeyer ................ 198/376 |
| 5,292,243 A * | 3/1994 | Gibbemeyer ................ 425/526 |
| 5,498,152 A | 3/1996 | Unterlander et al. |
| 5,660,902 A | 8/1997 | Unterlander et al. |
| 6,019,591 A * | 2/2000 | Valyi .......................... 425/534 |
| 6,102,685 A | 8/2000 | Miura et al. |
| 6,544,026 B1 | 4/2003 | Stocksiefen |
| 6,698,160 B2 | 3/2004 | Peronek et al. |
| 6,749,419 B2 | 6/2004 | Nightingale et al. |

(Continued)

*Primary Examiner*—Robert B Davis
(74) *Attorney, Agent, or Firm*—Knoble Yoshida & Dunleavy, LLC (57) ABSTRACT

A method of making a plastic container, comprises injection molding a container preform having a finish portion and a body portion, engaging the container preform with a transfer arm with the finish portion located in a predetermined orientation with respect to the transfer arm, contacting the container preform with a first brake adapted to substantially prevent rotation of the container preform with respect to the transfer arm, transferring the container preform from the transfer arm to a blow molding wheel with the finish portion in a predetermined orientation with respect to the blow molding wheel, enclosing the container preform within a blow mold cavity, and blow molding the container preform into a plastic container. A blow molding apparatus for making a plastic container is also disclosed.

25 Claims, 8 Drawing Sheets

U.S. PATENT DOCUMENTS

| | | |
|---|---|---|
| 6,805,548 B1 | 10/2004 | Evrard |
| 6,834,478 B2 | 12/2004 | Peronek et al. |
| 6,837,699 B2 | 1/2005 | Jandura |
| 6,851,944 B2 | 2/2005 | Effenberger |
| 2003/0082262 A1 | 5/2003 | Effenberger |
| 2003/0154694 A1 | 8/2003 | Peronek et al. |
| 2004/0065058 A1 | 4/2004 | Peronek et al. |
| 2004/0238475 A1 | 12/2004 | Peronek |

\* cited by examiner

METHOD AND APPARATUS FOR MAKING A PLASTIC CONTAINER HAVING AN ORIENTED FINISH PORTION

BACKGROUND OF THE INVENTION

1. Field of the Invention

The present invention relates generally to containers, and more particularly, to a method and apparatus for making plastic containers that have a finish portion that is oriented with respect to the body of the container.

2. Related Art

It is becoming more common for containers to have closures that include a feature that needs to be aligned with respect to the container body at a particular orientation. For example, a closure may have a dispenser that needs to be aligned with the front of the container body. Shampoo bottles often have such a requirement. As another example, a closure may have a spout that is preferably aligned with the handle of the container body, as is sometimes the case with detergent containers.

One known technique for orienting a closure with respect to a container body includes orienting the thread start on the finish portion of the container. In many types of blow molding operations, the threads are formed on a preform that is subsequently used to blow mold the container body. In these types of operations, the preform needs to be maintained at a specific orientation with respect to the blow mold cavity in order for the threads to hold their specific orientation with respect to the container body, once formed. Existing blow molding machines, however, allow for the preform to rotate during one or more stages of the blow molding process, thereby introducing inaccuracy into the alignment of the container body and the threads. This can ultimately result in inaccuracy in the alignment of the closure and the container body.

What is needed, therefore, is a method of orienting a finish portion on a plastic container that overcomes the shortcomings of prior art offerings.

BRIEF SUMMARY OF THE INVENTION

The present invention relates to a method of making a plastic container. According to one exemplary embodiment, the method comprises injection molding a container preform having a finish portion and a body portion, engaging the container preform with a transfer arm with the finish portion located in a predetermined orientation with respect to the transfer arm, contacting the container preform with a first brake adapted to substantially prevent rotation of the container preform with respect to the transfer arm, transferring the container preform from the transfer arm to a blow molding wheel with the finish portion in a predetermined orientation with respect to the blow molding wheel, enclosing the container preform within a blow mold cavity, and blow molding the container preform into a plastic container.

The present invention also relates to a blow molding apparatus for making a plastic container. According to one exemplary embodiment, the apparatus comprises an injection mold adapted to form a container preform having a finish portion and a body portion, the container preform defining a longitudinal axis, a transfer arm adapted to transfer the container preform from the injection mold to a blow mold station, a first brake located on the transfer arm and adapted to maintain the finish portion in a predetermined orientation with respect to the transfer arm, and a blow mold located at the blow mold station, the blow mold adapted to form the container preform into a plastic container.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without departing from the spirit and scope of the invention.

Figure 1A:
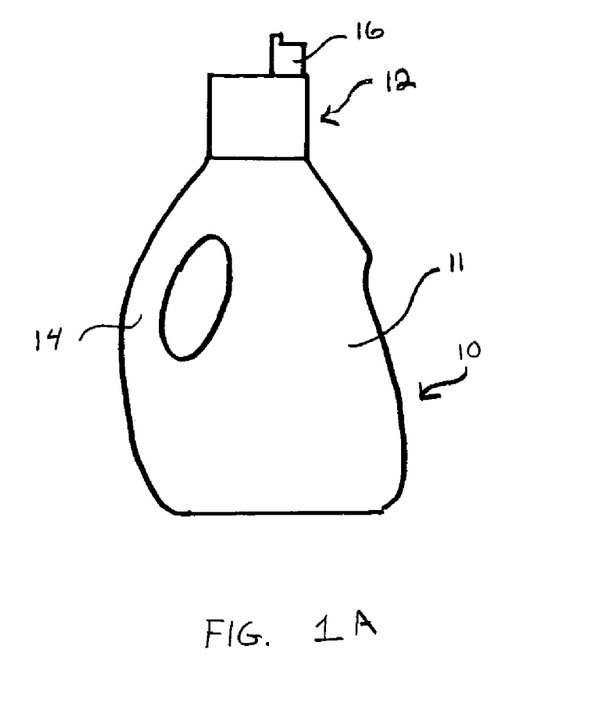
FIG. 1A is a side view of an exemplary plastic container including a body with a handle, and an exemplary closure having a dispenser oriented with respect to the handle.
Figure 1B:
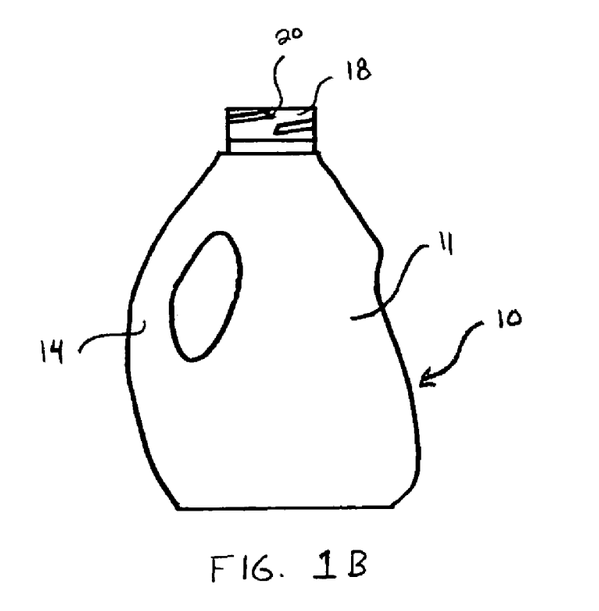
FIG. 1B is a side view of the container of FIG. 1A, shown with the closure removed.

The present invention relates to a method and apparatus for making plastic containers having oriented finishes. Referring to FIGS. 1A and 1B, an exemplary container 10 and closure 12 are shown. The container 10 can include a body 11 having a feature that is preferably oriented with respect to the closure 12. For example, in the exemplary embodiment shown, the container body 11 has a handle 14 that is oriented with respect to a spout 16 on the closure 12 in order to optimize the pourability of the liquid contents. One exemplary way to provide orientation between the container body 11 and the closure 12 is to include a feature on the container finish 18 that stops rotation of the closure 12 at a predetermined position during threading of the closure 12 onto the finish 18. For example, the thread start 20 on the closure 12 can be oriented with respect to the container body 11. Alternatively, a portion of the thread on the finish 18 and/or closure 12 can be deformed. Alternatively, cooperating surfaces (not shown) can be located on the closure 12 and finish 18 to orient the closure 12 with respect to the container body 11. One of ordinary skill in the art will know that other configurations can be implemented on the finish 18 and/or the closure 12 in order to provide orientation of the closure 12. One of ordinary skill in the art will also know that other container features besides handles and spouts can alternatively be oriented with respect to one another, such as ornamental features, labeling, etc.

Figure 13:
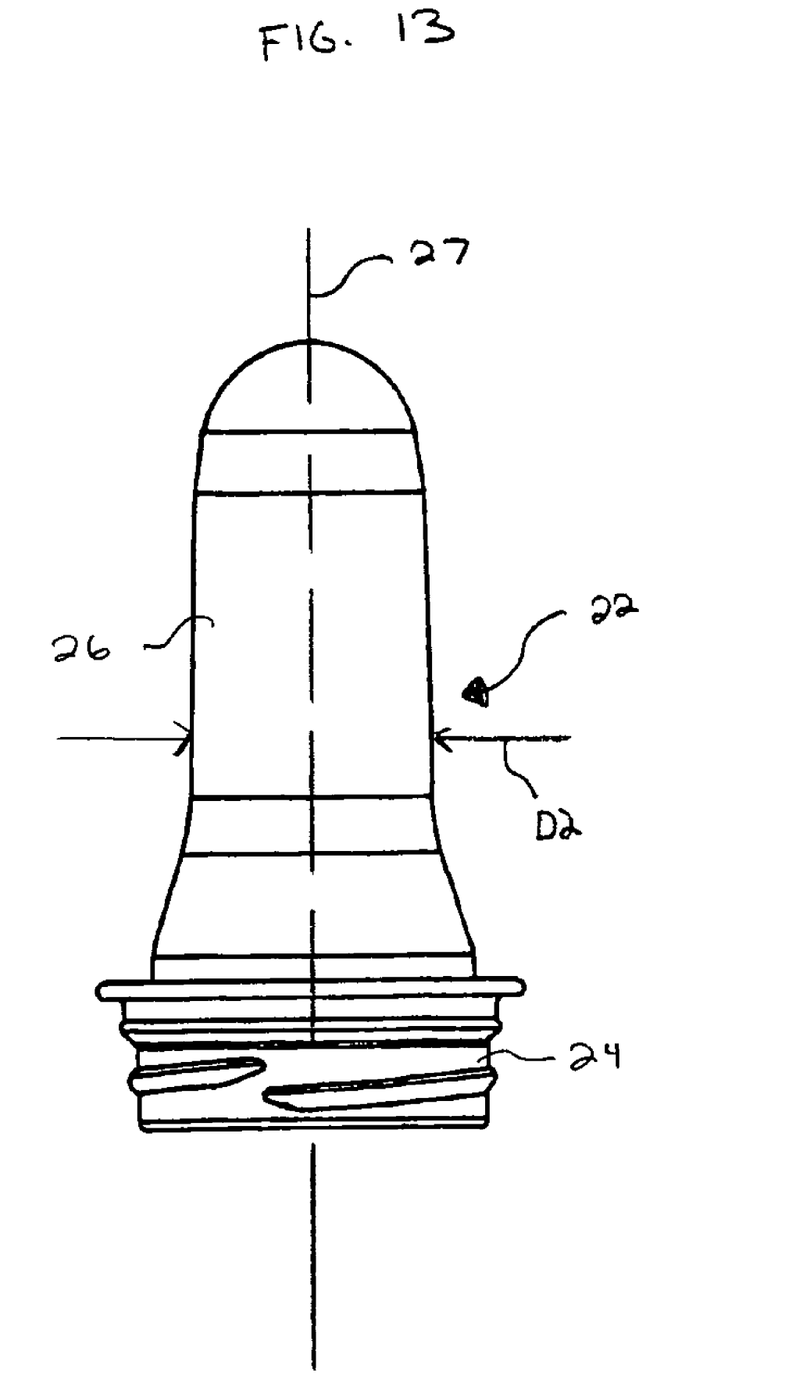
FIG. 13 is a side view of an exemplary container preform having a body portion and a finish portion.

Referring to FIG. 13, many containers are blow molded from a preform 22 that is made prior to the blow molding step. The preform 22 can include a finish portion 24 and a body portion 26. The finish portion 24 can be formed during an injection molding process, and can include threads 28 and other features, such as an orientation feature. The body portion 26 is typically enclosed in a blow mold, heated, and expanded to form the container body 11. In order for any orientation feature(s) on the finish portion 24 to be effective, the preform 22 needs to be clamped in the blow mold with the finish portion 24 in a preset orientation. The method and apparatus of the present invention aim to maintain the orientation of the preform finish 24 throughout one or more steps of the bottle making process, for example, from making the preform to blow molding the container, thereby increasing the accuracy of the orientation of the container finish 18 with respect to the container body 11.

Figure 2:
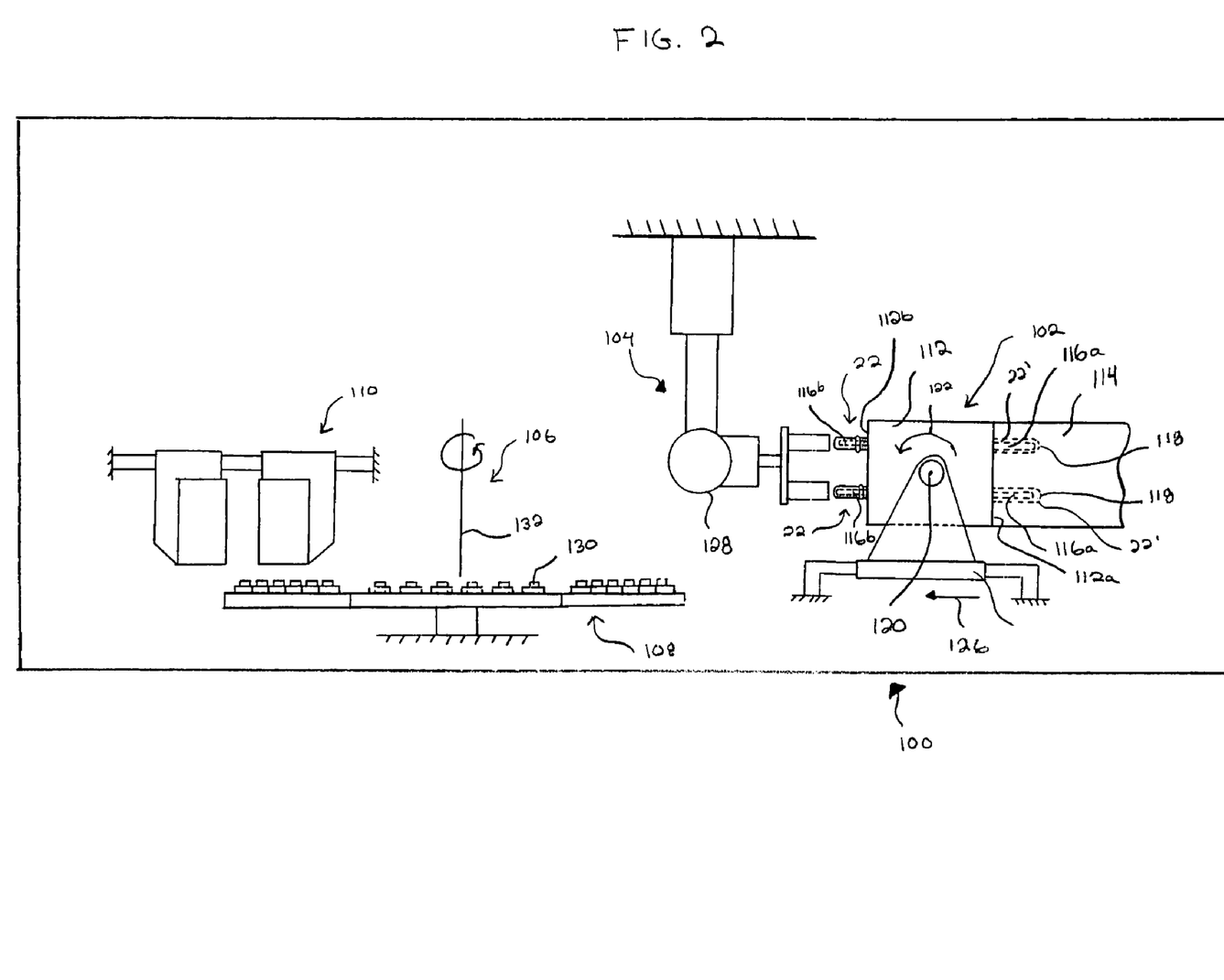
FIG. 2 is a schematic representation of a blow molding apparatus according to the present invention.

Referring to FIG. 2, an exemplary blow molding apparatus according to the present invention is shown. Various well known features of the blow molding apparatus 100, such as actuators, hoses, cables, conveyors, guards, etc., are omitted for clarity. The apparatus 100 can generally include an injection mold 102, a transfer arm 104, and a blow molding station 106 including a blow wheel 108 and one or more blow molds 110. The individual components of the blow molding apparatus 100 can be interconnected with one another, for example, using a common support frame (not shown), or alternatively, the individual components can be freestanding and located in working proximity to one another. According to one exemplary embodiment, the present invention can be implemented on a modified Huksy™ ISB machine, however, the invention it is not limited to practice on this machine.

Still referring to FIG. 2, the injection mold 102 can be adapted to form a plurality of container preforms, such as the preform 22 shown in FIG. 13. As described above, the preform 22 can include a finish portion 24, and a body portion 26, and can define a longitudinal axis 27. Any number of injection molding processes known in the art can be implemented to injection mold the container preform.

As shown in FIG. 2, the injection mold 102 can include a central mold portion 112 and a cooperating outer mold portion 114 (only a portion of which is shown). The central mold portion 112 can include a first set of core rods 116a (or other mold portions) located on one side 112a of the central mold portion 112, and a second set of core rods 116b (or other mold portions) located on the opposite side 112b. The outer mold portion 114 can include one or more mold cavities 118 arranged in a similar pattern to each set of core rods 116a, 116b. In the exemplary embodiment shown, each set of core rods 116a, 116b, as well as the mold cavities 118, are arranged into upper and lower parallel rows (extending into the paper), however, other arrangements of single or multiple core rods and mold cavities are possible.

The first and second sets of core rods 116a, 116b can register with the mold cavities 118 in alternation. In the exemplary embodiment shown, the central mold portion 112 can pivot about a pivot point 120 (in the direction of arrow 122) between the position shown in FIG. 2, where the first set of core rods 116a is in registration with the mold cavities 118, and a position offset by approximately 180° (not shown) where the second set of core rods 116b is in registration with the mold cavities 118. For example, the central mold portion 112 can pivot about an axle or support structure known in the art. A motor, not shown, or other device can impart movement to the central mold portion 112, for example, under the control of a central computer, such as a programmable logic controller (PLC), not shown. One of ordinary skill in the art will know that any number of mechanical and/or computer implemented configurations known in the art can be used to control movement of the central mold portion 112.

When one of the sets of core rods 116a, 116b is in registration with the mold cavities 118, the corresponding core rods and mold cavities together define a mold in which a preform 22 can be injection molded, for example, using various injection molding techniques known in the art. After the preforms 22 have been injection molded, the core rods 116a or 116b can separate from the mold cavities 118, for example, by automated movement of the central mold portion 112 along linear bearings 124 in the direction 126. This movement can remove the newly formed preforms 22 from the mold cavities 118. The newly formed preforms 22 can remain on the respective core rods 116a, 116b during the 180° pivoting movement of the central mold portion 112. Consequently, as illustrated in FIG. 2, a newly formed set of preforms 22 remains on one set of core rods (116b in FIG. 2) at approximately the same time as a new set of preforms 22' is injection molded in the cavities defined by the other set of core rods (116a in FIG. 2) and the mold cavities 118. The transfer arm 104, to be discussed in more detail below, can remove the newly formed preforms 22 from the core rods for subsequent processing. This cycle can continue with the transfer arm 104 removing newly formed preforms 22 from one of the sets of core rods 116a, 116b, at approximately the same time as new preforms 22' are being injection molded in the cavities defined by the mold cavities 118 and the other set of preforms 116a, 116b. Since the preforms 22 are formed during injection molding in the injection mold 102, all of the preforms 22 are located in a predetermined orientation (with respect to their longitudinal axis) when they exit the mold cavities. This orientation is based primarily on the configuration of each mold cavity. Since the preforms 22 fit closely around the core rods 116a, 116b, there is little chance of this orientation being changed as the central mold portion 112 rotates through 180° to present the preforms 22 to the transfer arm 104. One of ordinary skill in the art will know that the present invention is not limited to the embodiment of the injection mold 102 shown, and that any number of injection molding machines known in the art may alternatively be used.

Still referring to FIG. 2, the transfer arm 104 can engage the newly formed preforms 22 and transfer them to the blow molding wheel 108, which then transports the preforms 22 to the blow mold 110, which in turn blows the preforms 22 into finished containers. The transfer arm 104 can comprise an automated or robotic arm that is movable along multiple axes, such as side-to-side and up-and-down, and can also pivot, for example, about joint 128. The transfer arm 104 can be controlled by a central computer, such as a programmable logic controller (PLC), not shown. One of ordinary skill in the art will know that any number of mechanical and/or computer implemented configurations known in the art can be used to control movement of the transfer arm 104. One of ordinary skill in the art will also know that the transfer arm 104 is not limited to the configuration shown in the drawings.

The blow molding wheel 108 can comprise a rotating member having a plurality of mandrels 130 located around its periphery. The mandrels 130 can be adapted to support the preforms 22, for example, by engaging the finish portion 24. In the exemplary embodiment shown, the blow molding wheel 108 is a polygonal, horizontal wheel that rotates about axis 132, however other blow molding wheel shapes, orientations, and configurations are known in the art and can be used instead. The blow molding wheel 108 can rotate about axis 132 in timed coordination with the injection mold 102, the transfer arm 104, and/or the blow mold 110, for example, under the control of a central computer, such as a programmable logic controller (PLC), not shown, or other known mechanical or computer-based controller.

Figure 3:
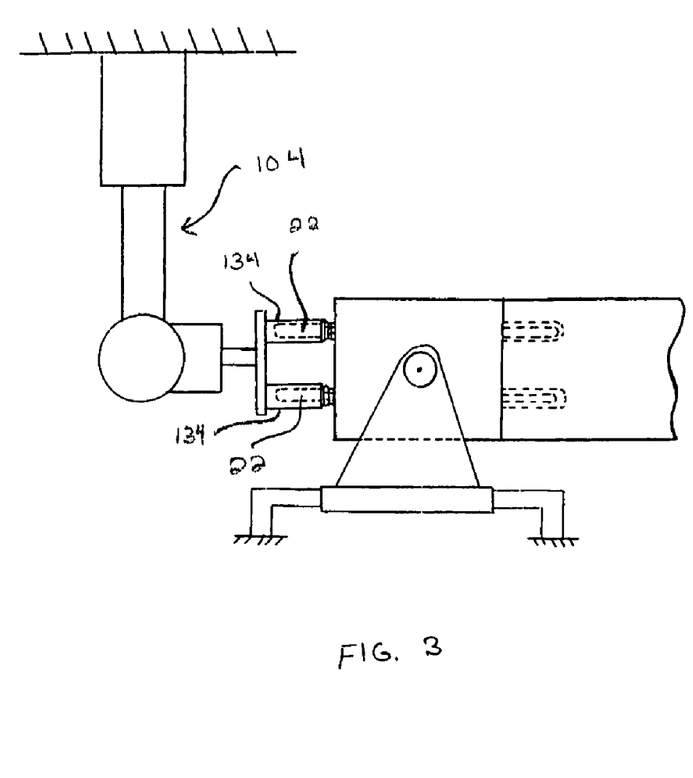
FIG. 3 is a schematic representation of an exemplary injection mold and an exemplary transfer arm of the apparatus of FIG. 2.
Figure 4:
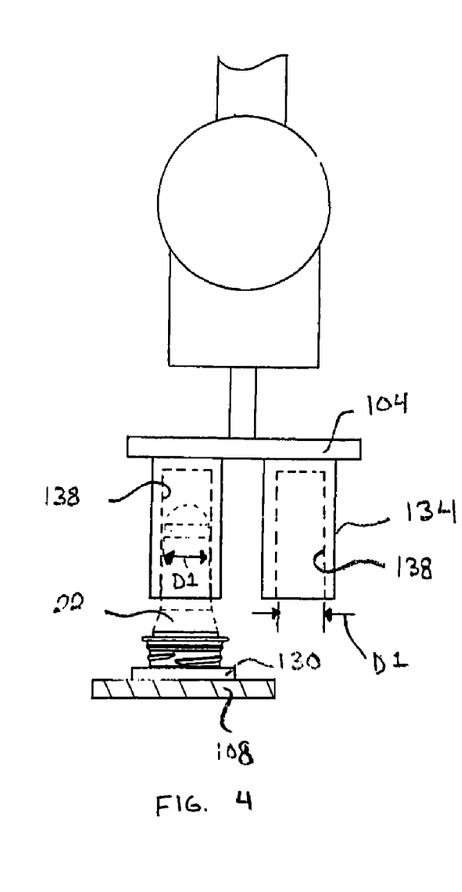
FIG. 4 is a schematic representation of an exemplary mandrel and an exemplary transfer arm of the apparatus of FIG. 2.

In order for the preforms 22 to enter the blow mold 110 in the proper orientation, it is important for the preforms to maintain their orientation (about their longitudinal axis) during several steps, including: transfer from the injection mold 102 to the transfer arm 104, transport on the transfer arm 104, placement on the mandrels 130 by the transfer arm 104, and/or transport to the blow mold 110 on the blow wheel 108. Referring to FIGS. 3 and 4, the present invention provides a braking mechanism that maintains this orientation throughout one or more stages of the bottle manufacturing process.

FIG. 3 illustrates one exemplary embodiment of engaging the container preforms 22 with the transfer arm 104. According to the exemplary embodiment shown, the transfer arm 104 includes an array of tubular preform holders 134 arranged in the same pattern as the core rods 116a, 116b (FIG. 2). Each of the tubular preform holders 134 can engage one of the preforms 22 around its external surface. Since this step of the method typically occurs shortly after the preforms 22 are injection molded in the injection mold 102 (FIG. 2), the preforms 22 should still have their proper orientation with respect to their longitudinal axes. In order to maintain this orientation during transport on the transfer arm 104, each of the container preforms 22 can be contacted by a first brake associated with the transfer arm. The first brake device can be adapted to substantially prevent rotation of the preforms 22 with respect to the transfer arm 104. For example, the first brake device can substantially prevent rotation of each preform 22 within its respective holder 134.

In the exemplary embodiment of FIG. 3, the first brake comprises an interference fit between each of the preforms 22 and the preform holders 134. As best seen in FIG. 4, each of the tubular preform holders 134 can have an inner diameter D1 that is slightly smaller than the outer diameter D2 of one or more portions of the preforms 22 (shown in FIG. 13). Frictional forces between the preforms 22 and the preform holders 134, caused by the interference fit, can substantially prevent rotation of the preforms 22 with respect to the preform holders 134. Referring to FIG. 4, the inner surface 138 of each of the preform holders 138 can be formed of or include a layer of compressible material such as plastic, rubber, foam, etc., to better facilitate engagement and disengagement of the preforms 22 by the preform holders 134. As an alternative to the interference fit, the first brake can be as simple as the frictional forces present between each preform 22 and its respective preform holder 134 due to the weight of the perform 22 itself.

Figure 5:
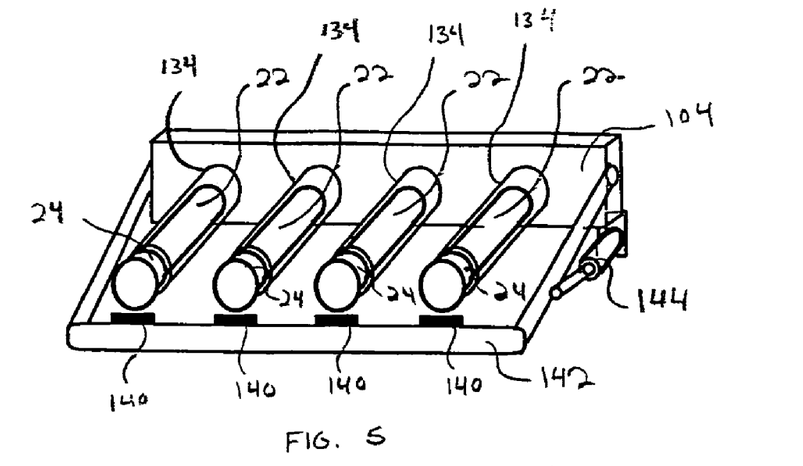
FIG. 5 is a schematic representation of an exemplary brake adapted to engage a plurality of container preforms, shown with the brake disengaged from the preforms.
Figure 6:
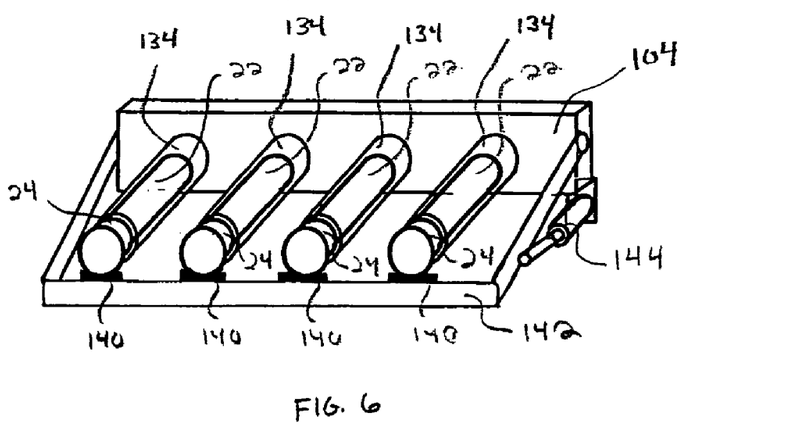
FIG. 6 is a schematic representation of the exemplary brake of FIG. 5, shown with the brake acting on the preforms.

Referring to FIGS. 5 and 6, an alternative embodiment of the first brake is shown. According to this embodiment, the first brake can comprise brake pads 140 that move from a first position (FIG. 5) where the brake pads 140 are spaced from the preforms 22, to a second position (FIG. 6) where the brake pads 140 contact the preforms 22, for example, along an external surface of the finish portion 24. The brake pads 140 can be located on a pivoting arm 142 that moves the pads 140 between the first and second positions, for example, under the power of an air cylinder 144 or similar device. The air cylinder 144 can be controlled by, for example, a central computer, such as a programmable logic controller (PLC), not shown, or other known mechanical or computer-based controller. In the exemplary embodiment of FIGS. 5 and 6, a brake pad 140 is provided for each preform 22, however, according to an alternative embodiment, one brake pad can be provided to act on all of the preforms. Alternatively, a single brake pad can be assigned to subgroups of preforms. The brake pads 140 can be formed of metals, polymers, composites, or other materials known in the art.

Figure 7:
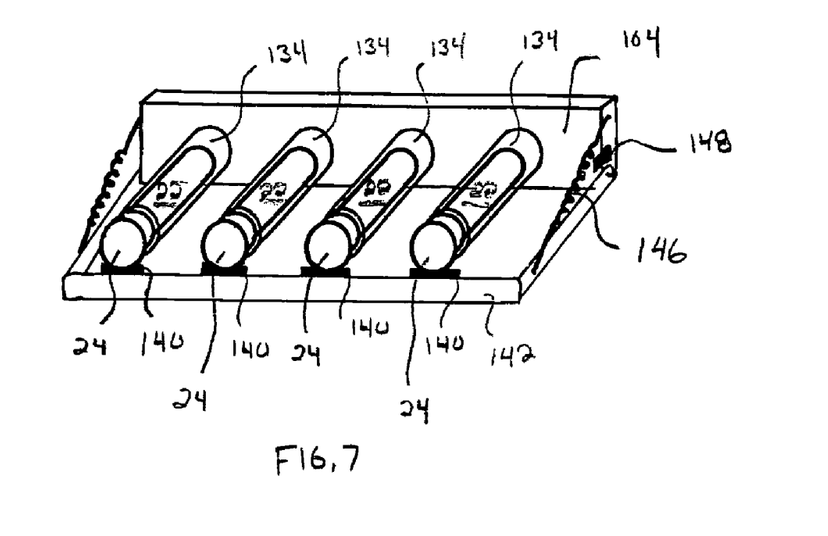
FIG. 7 is a schematic representation of another exemplary brake adapted to engage a plurality of container preforms, shown with the brake acting on the preforms.

Referring to FIG. 7, an alternative embodiment is shown where the first brake device is spring-loaded. According to this embodiment, a spring 146 extends between the pivoting arm 142 and the transfer arm 104, and biases the brake pads 140 into contact with the preforms 22. A stop block 148 can be provided on the pivoting arm 142. The stop block 148 can be configured and dimensioned to engage the pivoting arm 142 and prevent the pivoting arm 142 from pivoting to a point where the pivoting arm 142 and/or brake pads 140 interfere with insertion the preforms 22 into the preform holders 134 (e.g., upon initial engagement of the empty transfer arm 104 with the preforms 22 at the injection molding machine 102). One of ordinary skill in the art will know that other arrangements of springs, air cylinders, or other devices can be used to activate the brake pads 140.

In the exemplary embodiments shown in FIGS. 5-7, the transfer arm 104 includes a single row of four preform holders 134 (instead of two rows of four preform holders 134, as shown in FIG. 24), however, the brake devices shown in FIGS. 5-7 can be implemented into multi-row embodiments, for example, by providing one pivoting arm 142 for each row of preform holders 134. Moreover, one of ordinary skill in the art will know that the present invention is not limited to any specific number, or arrangement of preform holders 134 on the transfer arm 104.

At the same time as, or shortly after the transfer arm 104 engages the preforms 22 at the injection molding machine 102, the first brake acts on the performs 22. The transfer arm 104 then transports the preforms 22 to the blow wheel 108, for example, under the control of a central computer. Referring back to FIG. 4, the step of transferring the preforms 22 from the transfer arm 104 to the blow wheel 108, and specifically, the mandrels 130, is shown. In this step, the transfer arm 104 moves a row of preforms 22 into place over a corresponding row of mandrels 130 and places the preforms 22 down onto the mandrels 130, with the mandrels 130 engaging the inner surface of the preforms. In the case where the transfer arm 104 includes multiple rows of preforms 22 (the exemplary embodiment shown includes two rows of four preforms), the first row can be placed on a set of mandrels 130, then the blow wheel 108 can rotate or index to present an empty set of mandrels 130, and then the transfer arm 104 can place the next row of preforms 22 onto the empty mandrels 130. One of ordinary skill in the art will know, however, that the present invention is not limited to any specific arrangement of preforms and mandrels, or to any specific sequence of placing the preforms onto the mandrels.

Due to the previously-described first brake device, the preforms 22 are still in the correct orientation when presented to the mandrels 130 by the transfer arm 104. In order to maintain this orientation while the preforms 22 are transported on the blow wheel 108, a second brake associated with the blow wheel 180 can be applied to the preforms 22.

According to one exemplary embodiment, the second brake can comprise an interference fit between the preform 22 and the mandrel 130. For example, the mandrel 130 can include an engaging portion 150, shown in FIG. 8, that extends into the inner portion of the preform 22. The engaging portion 150 can have an outer diameter D3 that is slightly larger than the inner diameter D4 of the preform 22, thereby creating an interference fit when the preform 22 is placed onto the mandrel 130 by the transfer arm. The outer surface 152 of the engaging portions 150 can be formed of or include a layer of compressible material such as plastic, rubber, foam, etc., to better facilitate engagement and disengagement of the preforms 22 by the engaging portions 150. As an alternative to the interference fit, the second brake can be as simple as the frictional forces present between each preform 22 and the mandrel 130 due to the weight of the perform 22 itself.

Figure 8:
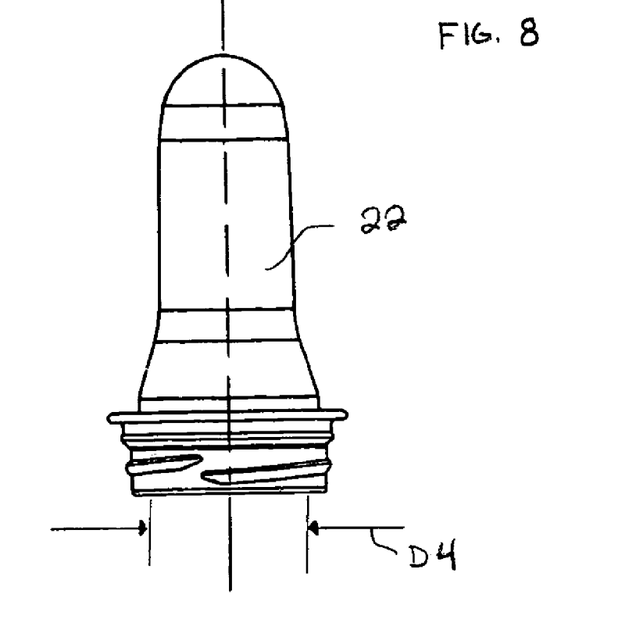
FIG. 8 is a schematic representation of an exemplary mandrel and brake of the apparatus of FIG. 2.

According to another embodiment, the second brake can be spring loaded. For example, one or more leaf springs 152 can be located on the mandrel 130 and provide a secure attachment of the preform 22 to the mandrel 130 that substantially prevents rotation between the two parts.

Figure 9:
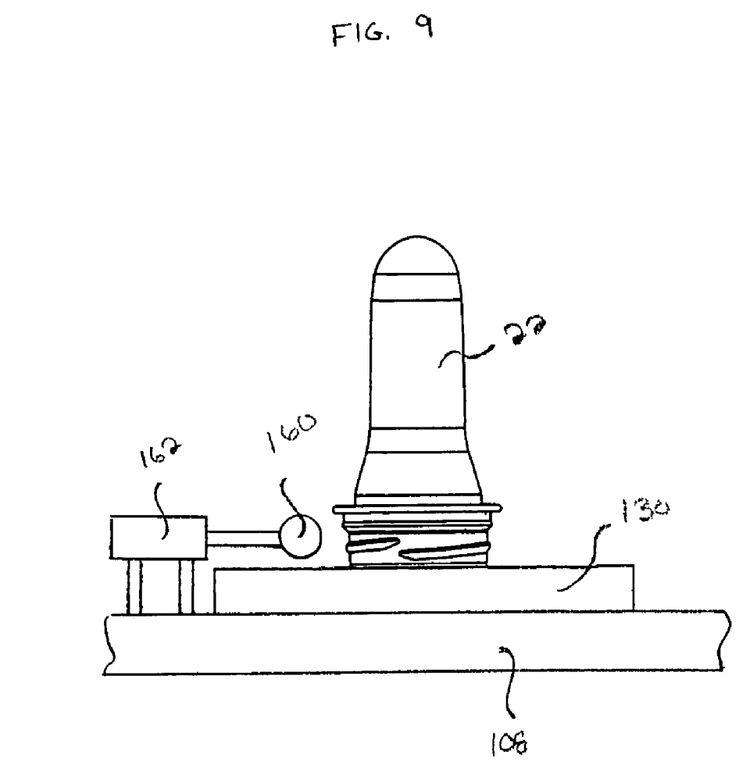
FIG. 9 is a schematic representation of another exemplary mandrel and brake of the apparatus of FIG. 2, shown with the brake disengaged from the container preform.
Figure 10:
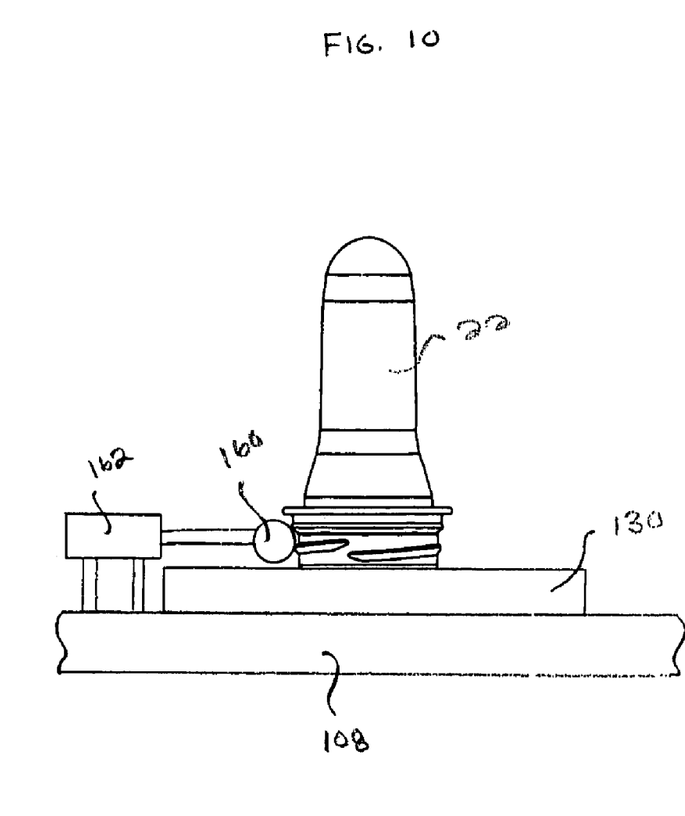
FIG. 10 is a schematic representation of the exemplary mandrel and brake of FIG. 9, shown with the brake acting on the preform.

Referring to FIGS. 9 and 10, another exemplary embodiment of the second brake is shown. According to this embodiment, the second brake comprises a brake pad 160 that is movable between a first position (FIG. 9) where the brake pad 160 is spaced from the preform 22, to a second position (FIG. 10) where the brake pad 160 contacts the preform 22. The brake pad 160 can be moved into contact with the preform 22 shortly after the transfer arm 104 places the preform 22 on the mandrel 130. The brake pad 160 can be disengaged from the preform 22, for example, after the preform 22 has been blown into a container. The brake pad 160 can be moved between the first and second positions, for example, by an air cylinder 162 or similar actuator associated with the blow wheel 108. The air cylinder 162 can be controlled by, for example, a central computer, such as a programmable logic controller (PLC), not shown, or other known mechanical or computer-based controller. In the exemplary embodiment of FIGS. 9 and 10, a brake pad 160 is provided for each preform 22, however, according to an alternative embodiment, one brake pad can be provided to act on all of the preforms. Alternatively, a single brake pad can be assigned to a subgroup of preforms. The brake pads 160 can be formed of metals, polymers, composites, or other materials known in the art. The brake pads 160 can alternatively be spring biased to move towards the preform. Other configurations known in the art are also possible.

Once the preforms 22 have been placed onto the blow wheel 108, the blow wheel indexes until the preforms 22 align with respective blow molding cavities in the blow mold 110. One or more processes, such as heating, may be applied to the preforms 22 on their way to the blow molding cavities. It is important, however, that the preforms 22 do not rotate about their longitudinal axes with respect to the blow wheel 108 during any of these processes. This can be achieved, for example, by applying the second brake from the time the preforms 22 are placed on the blow wheel 108 until the time the preforms 22 enter the blow molding cavities.

Figure 11:
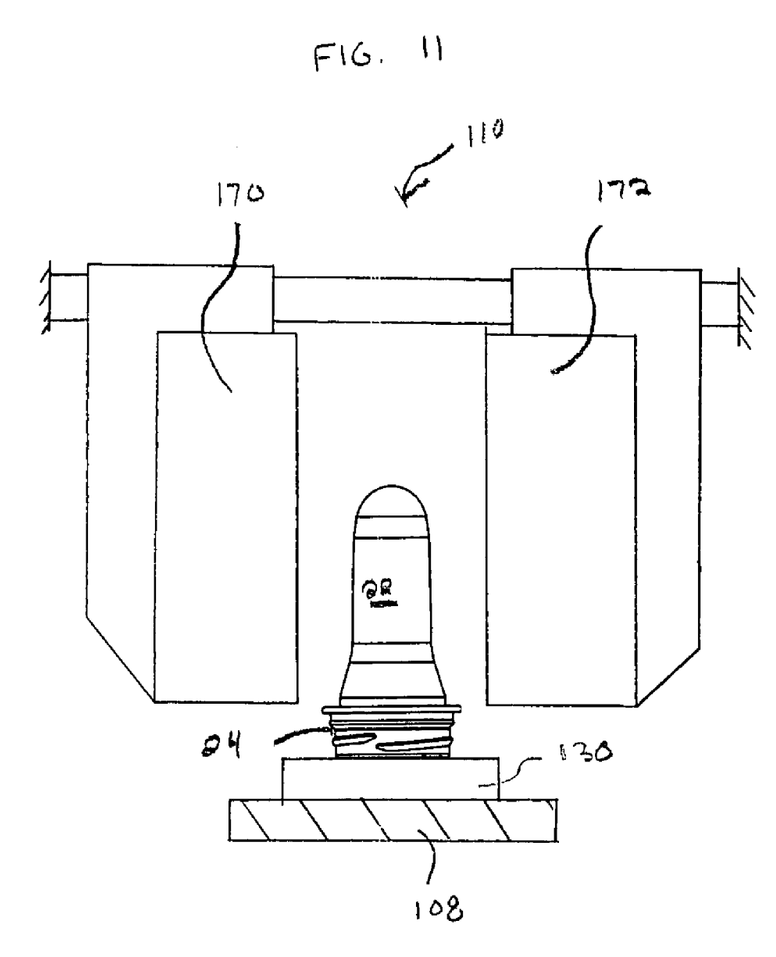
FIG. 11 is a schematic representation of an exemplary blow mold of the apparatus of FIG. 2, shown with the blow mold in an open position and surrounding a container preform.
Figure 12:
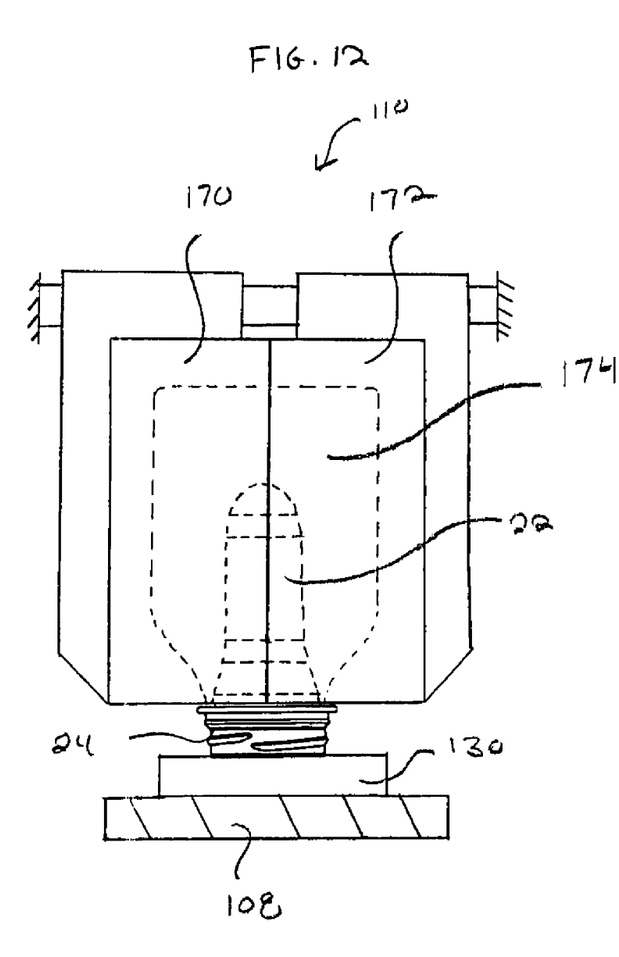
FIG. 12 is a schematic representation of the exemplary blow mold of FIG. 11, shown with the blow mold closed enclosing the container preform.

Referring to FIGS. 11 and 12, the steps of enclosing a preform 22 in a blow molding cavity and blow molding the preform are shown. FIG. 11 shows the preform 22 located between two blow mold halves 170, 172 in an open position. The blow mold halves 170, 172 close around the preform 22, as shown in FIG. 12, thereby forming a blow molding cavity 174 in the shape of a container around the preform 22. The mold halves 170, 172 can be closed and held closed using hydraulic presses, screw mechanisms, or other mechanisms known in the art. Due to the brake devices of the present invention, and the associated elimination of rotation of the preform 22 about its longitudinal axis during processing, the preform 22 will have its finish 24 (and any closure orienting features located thereon) in proper alignment with the mold cavity 174. The preform 22 is then blow molded, using any number of blow molding processes known in the art, to form a finished container, for example, the container 10 shown in FIGS. 1A and 1B. The container 10 will have its finish 18 properly oriented with respect to the body portion 11, thereby ensuring that any direction-specific features on the closure 12 will be properly aligned with the body portion 11 when the closure 12 is applied to the container 10.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of making a plastic container, comprising:
   (a) injection molding a container preform having a finish portion and a body portion;
   (b) engaging the container preform with a transfer arm with the finish portion located in a predetermined orientation with respect to the transfer arm;
   (c) contacting the container preform with a first brake adapted to substantially prevent rotation of the container preform with respect to the transfer arm;
   (d) transferring the container preform from the transfer arm to a blow molding wheel with the finish portion in a predetermined orientation with respect to the blow molding wheel;
   (e) enclosing the container preform within a blow mold cavity; and
   (f) blow molding the container preform into a plastic container.

2. The method of claim 1, wherein the step (b) comprises moving the first brake from a first position spaced from the container preform to a second position contacting the container preform.

3. The method of claim 2, wherein the first brake contacts an external surface of the finish portion when the first brake is in the second position.

4. The method of claim 2, wherein an air cylinder moves the first brake from the first position to the second position.

5. The method of claim 1, wherein the first brake is spring loaded.

6. The method of claim 1, wherein the step of contacting the container preform with a first brake comprises creating an interference fit between the container preform and the transfer arm.

7. The method of claim 1, wherein the step (d) comprises placing the container preform on a mandrel located on the blow molding wheel.

8. The method of claim 7, further comprising the step of contacting the container preform with a second brake to substantially prevent rotation of the container preform with respect to the mandrel.

9. The method of claim 8, wherein the step of contacting the container preform with a second brake comprises moving the second brake from a first position spaced from the container preform to a second position contacting the container preform.

10. The method of claim 9, wherein an air cylinder moves the second brake from the first position to the second position.

11. The method of claim 8, wherein the second brake is spring loaded.

12. The method of claim 8, wherein the step of engaging the container preform with the second brake comprises creating an interference fit between the container preform and the mandrel.

13. The method of claim 1, further comprising the step of ejecting the container preform from an injection mold with the finish portion in a predetermined orientation with respect to the injection mold.

14. The method of claim 1, wherein the plastic container has a body portion and a finish portion, with the finish portion oriented in a predetermined angular position with respect to the body portion.

15. A blow molding apparatus for making a plastic container, comprising:
    an injection mold adapted to form a container preform having a finish portion and a body portion, the container preform defining a longitudinal axis;
    a transfer arm adapted to transfer the container preform from the injection mold to a blow mold station;
    a first brake located on the transfer arm and adapted to maintain the finish portion in a predetermined orientation with respect to the transfer arm; and
    a blow mold located at the blow mold station, the blow mold adapted to form the container preform into a plastic container;
    wherein the first brake is movable from a first position spaced from the container preform to a second position contacting the container preform.

16. The blow molding apparatus of claim 15 wherein the first brake substantially prevents rotation of the container preform with respect to the transfer arm about the longitudinal axis.

17. The blow molding apparatus of claim 15, wherein the first brake contacts an external surface of the finish portion when the first brake is in the second position.

18. The blow molding apparatus of claim 15, wherein an air cylinder moves the first brake from the first position to the second position.

19. The blow molding apparatus of claim 15, wherein the first brake is spring loaded.

20. The blow molding apparatus of claim 15, further comprising:
    a blow molding wheel located at the blow mold station; and
    a mandrel located on the blow molding wheel, the mandrel adapted to support the container preform on the blow molding wheel.

21. The blow molding apparatus of claim 20, further comprising a second brake located on the mandrel and adapted to substantially prevent rotation of the container preform with respect to the mandrel.

22. The blow molding apparatus of claim 21, wherein the second brake is movable from a first position spaced from the container preform to a second position contacting the container preform.

23. The blow molding apparatus of claim 22, further comprising an air cylinder adapted to move the second brake from the first position to the second position.

24. The blow molding apparatus of claim 21, wherein the second brake is spring loaded.

25. A blow molding apparatus for making a plastic container, comprising:
    an injection mold adapted to form a container preform having a finish portion and a body portion, the container preform defining a longitudinal axis;
    a transfer arm adapted to transfer the container preform from the injection mold to a blow mold station;
    a first brake located on the transfer arm and adapted to maintain the finish portion in a predetermined orientation with respect to the transfer arm;
    a blow mold located at the blow mold station, the blow mold adapted to form the container preform into a plastic container;
    a blow molding wheel located at the blow mold station;
    a mandrel located on the blow molding wheel, the mandrel adapted to support the container preform on the blow molding wheel; and
    a second brake located on the mandrel and adapted to substantially prevent rotation of the container preform with respect to the mandrel.

\* \* \* \* \*

UNITED STATES PATENT AND TRADEMARK OFFICE
CERTIFICATE OF CORRECTION

| | | |
|---|---|---|
| PATENT NO. | : 7,611,659 B2 | Page 1 of 1 |
| APPLICATION NO. | : 11/416174 | |
| DATED | : November 3, 2009 | |
| INVENTOR(S) | : Wesley Spencer Hawk | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Twelfth Day of October, 2010

David J. Kappos
*Director of the United States Patent and Trademark Office*